United States Patent Office 3,497,462
Patented Feb. 24, 1970

3,497,462
COPPER (I) ZEOLITES
Ulrich K. Kruerke, Brussels, Belgium, assignor to Union Carbide Corporation, a corporation of New York
No Drawing. Filed Sept. 20, 1967, Ser. No. 669,290
Int. Cl. B01j 11/58, 11/32
U.S. Cl. 252—454                                7 Claims

ABSTRACT OF THE DISCLOSURE

There is disclosed novel copper (I) zeolites of the molecular sieve type and two processes for preparing them. The copper (I) zeolites can be prepared by ion exchange between a zeolite (usually a sodium zeolite) and a solution of cuprous iodide, or by reduction of conventional copper (II) zeolite with carbon monoxide, ammonia, olefinic hydrocarbons, or acetylenic hydrocarbons.

---

The invention relates to novel copper (I), i.e., cuprous, zeolites and to processes for making them. In one aspect, the invention relates to novel compositions comprising copper (I) zeolites. In another aspect, the invention relates to a process for making copper (I) zeolites by ion-exchanging a zeolite with a solution of cuprous iodide in a suitable solvent such as liquid ammonia. In a further aspect, the invention relates to a process for producing copper (I) zeolites by reducing copper (II) zeolites with carbon monoxide, ammonia, olefinic hydrocarbons, and acetylenic hydrocarbons.

Copper zeolites wherein the copper is in the elemental form are known, for example, they are disclosed in U.S. Patents 3,013,982 and 3,013,985 to Breck et al. Copper (II) zeolites are also known. They are prepared by an ion-exchange between, e.g., sodium zeolite and an aqueous solution of a cupric salt. However, the copper (I) zeolites have not been isolated. The copper (I) zeolites cannot be prepared from an ion-exchange reaction between sodium zeolite and an aqueous solution of a cuprous salt because cuprous salts are not soluble in water. While water-soluble cationic complexes of cuprous salts can be prepared, it is difficult to prevent such complexes from oxidizing to the cupric state. Copper (I) zeolites cannot be prepared by the conventional hydrogen reduction of copper (II) zeolites because such reduction produces the elemental copper form rather than the copper (I) form. Thus, copper (I) zeolites have not been heretofore isolated.

Zeolites of the molecular sieve type are well known. For instance, the two Breck et al. patents mentioned above disclose methods of preparation of many synthetic zeolites, and the characterizations thereof. Naturally occurring zeolites of the molecular sieve type include chabazite, faujasite, erionite, mordenite, gmelinite, and the calcium form of analcite. The synthetic zeolites are usually prepared as sodium zeolites, although the cation can be another alkali metal such as potassium. The cation can also be ammonium. The cations in the naturally occurring zeolites are usually an alkali metal or an alkaline earth metal. The cations in these zeolites can be replaced with other cations to form molecular sieves having wide utility as catalysts for isomerization reactions, oxidation and/or reduction reactions, separation processes, and in many other applications. The Breck et al. Patent No. 3,013,985 indicates that copper (I) zeolite may have been prepared as a transitory material in preparing elemental copper zeolite from copper (II) zeolite. However, heretofore copper (I) zeolite has never been isolated per se. This invention provides copper (I) zeolite per se and two methods for preparing it.

The first method for preparing copper (I) zeolite comprises a cation exchange between a solution of cuprous iodide in a suitable solvent and an activated (i.e., dehydrated) metal zeolite of the molecular sieve type. The solvent should be one that dissolves both cuprous iodide and the iodide of the cation to be replaced in the zeolite starting material. This will usually be sodium iodide, but other cations can also be present (for example, potassium, ammonium, and the like). Solvents that can be used include liquid ammonia, liquid sulphur dioxide, dimethyl sulfoxide, acetonitrile, N,N-dimethylformamide, and other highly polar, nonaqueous solvents that dissolve both cuprous iodide and the iodide of the cation in the zeolite starting material. Liquid ammonia is the preferred solvent.

The concentration of the cuprous iodide in the solvent is not narrowly critical. However, it is preferred that sufficient cuprous iodide be present so that the production of copper (I) zeolite containing at least about 1 weight percent of copper is permitted.

When the solvent used is liquid ammonia or liquid sulfur dioxide, the temperature of the ion exchange reaction is conveniently the boiling point of the solvent at about atmospheric pressure. When other solvents are used, the reaction can be carried out at room temperature. Higher and lower temperatures than those indicated can also be used, if desired.

The ion exchange reaction should be carried out in an inert atmosphere such as nitrogen to prevent the oxidation of the cuprous iodide to cupric iodide.

The reaction time can vary over a fairly wide range, for instance, from about one-half hour to five hours. The exact time is not critical, but it is preferred to carry out the reaction for a period of time sufficient to produce a copper (I) zeolite containing at least about 1 weight percent copper.

The ion-exchange can be carried out simply by intimately contacting the zeolite starting material with the copper (I) iodide solution in a suitable vessel, which can be glass, stainless steel, mild steel, or the like. The zeolite is then recovered by separating it from the ion-exchanging solution by filtration, or the like. Absorbed ammonia can be removed from the zeolite by first passing a stream of dry nitrogen through the zeolite, and then by slowly heating the zeolite in a vacuum from room temperature to an elevated temperature of, for example, about 350° C. The product, copper (I) zeolite, is thereby recovered.

In the second method for producing copper (I) zeolite, copper (II) zeolite is reduced to copper (I) zeolite by carbon monoxide, ammonia, an olefinic hydrocarbon, or an acetylenic hydrocarbon. The copper (II) zeolite can be prepared by known procedures such as by an ion-exchange reaction between a sodium or potassium zeolite and an aqueous solution of a cupric salt such as cupric acetate or cupric chloride, followed by dehydration to activate the zeolite. The activated copper (II) zeolite is then contacted with the reducing agent to form the copper (I) zeolite. A convenient way to carry out the reduction is to simply pass a stream of the reducing agent through a bed of activated copper (II) zeolite to produce the copper (I) form. A conventional reaction tube equipped with heat transfer means, gas inlet and outlet means, and the like, can be used for the reduction.

Carbon monoxide and ammonia are the preferred reducing agents. With these two materials, elevated temperatures are used for the reduction. For instance, temperatures in excess of about 200° C., and preferably between about 250° to 300° C., are normally used. The reduction time depends, in part, upon how much copper (II) is present in the zeolite, the extent of conversion to copper (I) that is desired (normally, essentially complete conversion to copper (I) zeolite is desired, but this is not essential to the practice of the invention), the exact temperature, the nature of the reactants, and the like. Reduction times of from about ½ to 10 hours can be employed with success in most cases.

After the reduction to copper (I) zeolite, the product is cooled under an atmosphere of the reducing agent, nitrogen, or the like.

When the reducing agent is an olefinic or acetylenic hydrocarbon, the temperature of the reduction can be much lower than that indicated above. Some reduction occurs at room temperature or a little above, although slightly elevated temperatures of up to about 100° C. are preferred. Reduction times are similar to those encountered when ammonia or carbon monoxide is used. Among the unsaturated hydrocarbons that can be used as reducing agents are found ethylene, acetylene, propylene, propyne, butene-1, butene-2, isobutylene, butadiene, butyne-2, pentene, hexene, cyclohexene, and the like. The use of unsaturated hydrocarbons as the reducing agent is less preferred than the use of carbon monoxide or ammonia because the hydrocarbons generally do not effect complete reduction to the copper (I) zeolite. Another objection is that in many cases hydrocarbon by-products are left adsorbed in the molecular sieves.

After the reduction (with carbon monoxide, ammonia, or unsaturated hydrocarbon), the copper (I) zeolite is preferably purged with an inert gas such as nitrogen, slowly heated in a vacuum to a high temperature (e.g. up to about 350° C.), and then cooled to room temperature under an inert atmosphere.

In all cases, whether made by the first or the second method, the copper (I) zeolite should be stored in a dry, inert atmosphere such as nitrogen.

Copper (I) zeolite prepared by ion-exchanging using cuprous iodide is not identical to copper (I) zeolite prepared by reduction of copper (II) zeolite. The latter is decationized because the original copper ion loading replaced two equivalents of cation rather than one. Therefore, when the copper (II) is is reduced to copper (I), oxygen is lost from the anionic zeolite framework in order to maintain a balance of charges in the molecular sieve. This principle is well known in the art. Despite this difference, both forms of copper (I) zeolite have similar, although perhaps not identical, utility. For instance, the copper (I) zeolite can be used as either an oxidizing agent or as a reducing agent. Thus, the copper (I) zeolite can be used to remove at the same time gaseous impurities that are oxidizing agents such as sulfur dioxide and gaseous impurities that are reducing agents such as hydrogen sulfide from streams of hydrocarbons. Certain of the copper (I) zeolites can also be used to catalyze the reaction of butadiene with acetylene to form 1,4-dihydrobenzene. Copper (I) zeolite X is especially useful for this purpose. Certain of the copper (I) zeolites can be used to catalyze the dimerization of butadiene to 4-vinylcyclohexene. Copper (I) zeolite Y prepared by the ion-exchange method is particularly useful for this dimerization.

The following examples illustrate the invention:

EXAMPLE 1

Sodium zeolite Y (40 grams) was dehydrated for 6 hours in a vacuum at 300° C. The zeolite was then slurried in 150 milliliters of liquid ammonia in a fritted vessel. A stream of nitrogen was passed continuously through the fritte into the vessel. Freshly prepared cuprous iodide dissolved in 150 milliliters of liquid ammonia was slowly introduced into the vessel. The color of the zeolite turned to slightly bluish. After 1 hour, the solution was filtered off through the fritte. The procedure was repeated twice. The zeolite was dried in a stream of nitrogen for several hours after the ammonia solution had been filtered off. The zeolite was then heated in a vacuum at 150° C. for 2 hours and 300° C. for 5 hours. Chemical analysis showed the product to contain 6.6 weight percent copper which corresponds to an exchange of 26 percent and a content of 14 copper (I) ions per unit cell. X-ray diffraction analysis proved the complete retention of crystallinity.

EXAMPLE 2

By a procedure analogous to the one described in Example 1, 50 grams of dehydrated sodium zeolite X was exchanged with cuprous iodide in liquid ammonia. Chemical analysis of the white copper (I) zeolite X product revealed a content of 3.8 weight percent copper which corresponds to an exchange of 9.5 percent and a content of about 8 copper (I) ions per units cell. X-ray diffraction analysis showed that crystallinity had been retained.

EXAMPLE 3

Sodium zeolite of the type X (90 grams) was slurried at room temperature with 250 milliliters water in a 2 liter flask equipped with stirrer. After neutralization of the alkaline mixture with 0.2 N sulfuric acid, 560 milliliters of a 0.36 molar solution of copper (II) acetate were added and stirred at room temperature for one hour. The zeolite was filtered, washed with water and dried in air at 100° C. Chemical analysis of the product indicated 7.9 weight percent copper.

The copper-exchanged X-zeolite was placed in a horizontal tube and heated in vacuum at 300° C. for 4 hours to remove most of the water. The temperature was then reduced to 260° C. and the zeolite was purged at this temperature with a slow stream of dry carbon monoxide over a period of 5 hours. The originally green product became greyish-white during this operation. It was cooled to room temperature in the atmosphere of carbon monoxide and was stored under nitrogen.

The intensity of the EPR (electron paramagnetic resonance) signal of copper (II) ions in comparison to the initial non-reduced state revealed an almost quantitative reduction of copper (II) to copper (I). The X-ray diffraction pattern proved the crystal structure to be intact; there was no indication for the presence of metallic copper. The sample developed a yellow color on hydration with water vapor in vacuum at 0° C.

EXAMPLE 4

Copper (II)-exchanged zeolite X (7.8 grams) prepared in accordance with Example 3 was placed in an adsorption tube provided with high-vacuum stopcock and standard joint and was dehydrated in vacuum 6 hours at 250° C. The temperature was reduced to 220° C. and carbon monoxide was allowed to adsorb on the zeolite with stepwise increasing pressure from 250 mm. Hg to 500 mm. Hg. The color of the zeolite turned during this operation to bright green. The excess of carbon monoxide and the carbon dioxide formed were then pumped off at 250° C. On the basis of the EPR intensity of the $Cu^{++}$ signal in the initial state and after treatment with carbon monoxide, about 70 percent of the copper ions were reduced to the monovalent state. When this zeolite was not protected by an atmosphere of nitrogen but was kept in dry air at room temperature, a slow reoxidation occurred as indicated by the complete return of the EPR intensity of $Cu^{++}$ ions within several days.

EXAMPLE 5

Copper (II)-exchanged zeolite X (5.7 grams) prepared and activated in accordance with Example 3, was brought into contact with ammonia at about 700 mm. Hg at 250° C. over a period of 4 hours. The color of the sample turned to pale blue and became almost white on desorption of the excess of ammonia, some water and nitrogen in vacuum at 250° C. The EPR signal proved a reduction of about 80 percent of $Cu^{++}$ to $Cu^{+}$.

EXAMPLE 6

Sodium zeolite of the type Y (170 grams) was slurried at room temperature with 450 milliliters water and exchanged with a solution of 108 grams of $$Cu(CH_3COO)_2 \cdot H_2O$$

in 1.5 liter water giving a copper (II) zeolite with 6.0 weight percent of copper. In order to achieve a higher content of copper the exchange was repeated after filtration with the same quantity of copper (II) acetate yielding now a product containing 8.7 weight percent of copper.

The product was placed in a horizontal tube, activated (i.e. dehydrated), and treated with carbon monoxide in accordance with Example 3. It became almost white; on subsequent desorption of all the gases in vacuum at 260° C., 1.05 gram of carbon dioxide was trapped at liquid nitrogen temperature. The decrease of EPR intensity in comparison to the initial state revealed a reduction of 90 percent of the copper ions. The X-ray pattern showed a complete retention of the zeolite crystallinity.

EXAMPLE 7

Copper (II)-exchanged zeolite Y (13 grams) prepared according to Example 6 was placed in a vertical tube provided with joints and high-vacuum stopcocks on both ends. After activation in high-vacuum at 400° C. during 12 hours, the green copper (II) zeolite was treated at 250° C. during 3 hours with a slow stream of ammonia at a pressure around 700 mm. Hg the leaving ammonia being condensed at —40° C. in a trap of a closed high-vacuum system. At the end of this operation, the trap was cooled to liquid nitrogen temperature, the zeolite was heated to 400° C., and some non-condensable gas consisting of nitrogen (54 cc.) was pumped off whereby the excess ammonia and little water formed condensed in the trap. The white copper (I) zeolite was cooled to room temperature and protected by nitrogen. The EPR spectrum proved an almost quantitative reduction to $Cu^+$. On adsorption of water vapor in vacuum at 0° C., the sample gave a yellow color typical for hydrated copper (I) zeolitic molecular sieves.

EXAMPLE 8

Powder of synthetic Erionite (30 grams) was mixed with 100 milliliters of a solution of $CuCl_2$ (10 grams) and stirred at 100° C. during 1 hour. After filtration, this operation was repeated. Chemical analysis of the blue product yielded a content of 4.1 weight percent copper.

For dehydration the product was placed in a vacuum tube, connected to a high-vacuum equipment, evacuated and immediately heated at 450° C. The copper-erionite lost over a period of 4 hours 16.5 weight percent of water. The product was then transferred to a horizontal tube to be reduced in a slow stream of carbon monoxide. On raising the temperature slowly from room temperature the reaction started apparently around 170° C. After 30 minutes at 190° C., the product was purely white indicating a complete reduction to copper (I) erionite.

EXAMPLE 9

Copper (II) exchanged zeolite of the type X prepared in accordance with Example 3 was placed into a quartz tube for EPR-measurements which was provided with standard joints and high vacuum stopcock to be connected with a conventional high-vacuum equipment. The zeolite was dehydrated in vacuum 6 hours at 250° C. Contacting the sample at room temperature with butene-2 at about 700 mm. Hg turned the color of the sample from green to violet. The intensity of the EPR-signal of copper (II) in comparison with the original intensity after activation revealed a reduction of 29 percent of the copper (II) ions. Repeated treatment with butene-2 but at 110° C. during half an hour increased the degree of reduction to 70 percent.

EXAMPLE 10

The same activated Cu (II)-X as in Example 9 was treated in an identical manner with butyne-2 at room temperature and revealed about 30 percent reduction. On heating in contact with the alkyne at 110° C., the sample turned to dark-violet and the EPR showed a reduction of 65 percent of the original copper (II) ions.

What is claimed is:

1. Process for preparing copper (I) zeolite which comprises intimately contacting a rigid three-dimensional crystalline metal aluminosilicate zeolite of the molecular sieve type wth a solution of cuprous iodide in a non-aqueous polar solvent, whereby ion-exchange occurs between the exchangeable cations of the crystalline metal aluminosilicate zeolite and the cuprous ions in said solution, separating the crystalline metal aluminosilicate zeolite from the exchanging solution, and recovering thereby a copper (I) zeolite.

2. Process of claim 1 wherein said non-aqueous polar solvent is liquid ammonia.

3. Process of claim 1 wherein said crystalline metal aluminosilicate zeolite is a sodium zeolite.

4. Process of claim 3 wherein said sodium zeolite is sodium zeolite X or sodium zeolite Y.

5. Process for preparing copper (I) zeolite which comprises intimately contacting a rigid three-dimensional crystalline metal aluminosilicate zeolite of the molecular sieve type, at least some of said metal being cupric cations, with a reducing agent selected from the group consisting of ammonia, carbon monoxide, olefinic hydrocarbons, or acetylenic hydrocarbons, for a period of time and at a temperature sufficient to reduce at least some of said cupric ions to cuprous ions, and recovering thereby a copper (I) zeolite.

6. Process of claim 5 wherein said reducing agent is ammonia or carbon monoxide, and wherein the temperature is at least about 200° C.

7. Process of claim 5 wherein the zeolite is zeolite X or zeolite Y.

References Cited

UNITED STATES PATENTS 3,013,985   12/1961   Breck et al. _____ 252—455
3,219,592   11/1965   Hirschler _____ 252—455

DANIEL E. WYMAN, Primary Examiner

C. F. DEES, Assistant Examiner

U.S. Cl. X.R.

23—111; 252—455